US009604287B2

(12) United States Patent
Lee et al.

(10) Patent No.: US 9,604,287 B2
(45) Date of Patent: Mar. 28, 2017

(54) SETTING METHOD AND CONTROL DEVICE FOR INITIAL AXIAL DEPTH OF CUT OF ROTATING CUTTING TOOL

(71) Applicant: DOOSAN INFRACORE CO., LTD., Incheon (KR)

(72) Inventors: Kang Jae Lee, Gyeonggi-do (KR); Jin Suk Song, Gyeonggi-do (KR); Han Kee Jang, Gyeonggi-do (KR)

(73) Assignee: Doosan Machine Tools Co., Ltd., Gyeongsangnam-do (KR)

( * ) Notice: Subject to any disclaimer, the term of this patent is extended or adjusted under 35 U.S.C. 154(b) by 358 days.

(21) Appl. No.: 14/300,412

(22) Filed: Jun. 10, 2014

(65) Prior Publication Data

US 2014/0364990 A1    Dec. 11, 2014

(30) Foreign Application Priority Data

Jun. 10, 2013    (KR) .......................... 10-2013-0065805

(51) Int. Cl.
*B23C 3/00*    (2006.01)
*B23B 35/00*    (2006.01)

(52) U.S. Cl.
CPC ................ *B23C 3/00* (2013.01); *B23B 35/00* (2013.01); *B23B 2260/048* (2013.01); *B23C 2255/00* (2013.01)

(58) Field of Classification Search
None
See application file for complete search history.

(56) References Cited

U.S. PATENT DOCUMENTS

| 6,993,410 | B2 * | 1/2006 | Esterling | B23Q 17/0976 409/131 |
| 7,730,813 | B2 * | 6/2010 | Schmitz | B23B 29/022 82/1.11 |
| 7,908,947 | B2 * | 3/2011 | Saeterbo | B23B 31/005 408/143 |
| 8,131,525 | B2 * | 3/2012 | Schmitz | G05B 19/404 700/160 |
| 2007/0056414 | A1 * | 3/2007 | Saeterbo | B23B 31/005 82/158 |

(Continued)

FOREIGN PATENT DOCUMENTS

| DE | 102007053644 A1 | 5/2009 |
| EP | 1514625 A1 | 3/2005 |
| EP | 2172293 A1 | 4/2010 |

OTHER PUBLICATIONS

European Search Report dated Nov. 14, 2014 for corresponding European Application No. 14171807.2, 6 pages.

*Primary Examiner* — Ronald Hartman, Jr.
(74) *Attorney, Agent, or Firm* — John D. Veldhuis-Kroeze; Westman, Champlin & Koehler, P.A.

(57) ABSTRACT

Disclosed are a setting method and a control device of a depth of cut in an initial axial direction for a rotating cutting tool.
A setting method of a depth of cut in an initial axial direction for a rotating cutting tool according to the present disclosure includes when a tool T is mounted on a spindle S, receiving an overhang length L of the tool T, the diameter D of the tool T, an overhang length ratio reference value C, and an axial depth of cut reference value E; calculating an axial depth of cut Y; and setting the axial depth of cut Y as an initial axial depth of cut of a cutting process.

6 Claims, 9 Drawing Sheets

(56) References Cited

U.S. PATENT DOCUMENTS

2007/0088456 A1* 4/2007 Schmitz .............. G05B 19/404
                                                        700/175
2010/0014927 A1   1/2010 Young et al.
2012/0111630 A1   5/2012 Chen et al.

* cited by examiner

OVERHANG LENGTH RATIO (L/D) RELATIONSHIP

EVALUATING RIGIDITY DEPENDING ON OVERHANG LENGTH RATIO(B: L/D)

| OVERHANG LENGTH RATIO [A] | OVERHANG LENGTH RATIO TO REFERENCE VALUE [B], C=3 | RIGIDITY WEIGHT [k] | RECOMMENDED AXIAL DEPTH OF CUT [Y (mm)], E=15 | CORRECTED AXIAL DEPTH OF CUT [Ad (mm)] | CORRECTED CONSTANT [n (mm)] |
|---|---|---|---|---|---|
| 3 | 1 | 1 | 15 | 15 | 0 |
| 3.5 | 1.17 | 0.63 | 9.5 | 9.4 | 0.1 |
| 4 | 1.33 | 0.42 | 6.3 | 6.2 | 0.1 |
| 4.5 | 1.5 | 0.3 | 4.5 | 4.3 | 0.2 |
| 5 | 1.67 | 0.22 | 3.3 | 3.1 | 0.2 |
| 5.5 | 1.83 | 0.16 | 2.4 | 2.2 | 0.2 |
| 6 | 2 | 0.12 | 1.8 | 1.5 | 0.3 |

DIAMETER OF TOOL(D): SET 10 mm

A = L / D

L: OVERHANG LENGTH

D: TOOL DIAMETER

C: OVERHANG LENGTH RATIO REFERENCE VALUE, 3 IS SET

E: AXIAL DEPTH OF CUT REFERENCE VALUE, 15 IS SET

Fig. 4

SETTING METHOD AND CONTROL DEVICE FOR INITIAL AXIAL DEPTH OF CUT OF ROTATING CUTTING TOOL

CROSS-REFERENCE TO RELATED APPLICATIONS

This application is based on and claims priority from Korean Patent Application No. 10-2013-0065805, filed on 10 Jun. 2013, with the Korean Intellectual Property Office, the disclosure of which is incorporated herein in its entirety by reference.

FIELD OF THE DISCLOSURE

The present disclosure relates to a setting method and a control device for initial axial depth of cut of rotating cutting tool, and more particularly, to a setting method and a control device for initial axial depth of cut of a rotating cutting tool that can set a depth of cut when a cutting tool rotating to cut a workpiece.

BACKGROUND OF THE DISCLOSURE

In general, motion such as tool path and revolutions per minute is numerically controlled, and as a result, a machine tool performs a cutting process of a workpiece. Examples of a machine tool include a machining center, a turning center, an NC milling machine, and the like. The machine tool is also referred to as a numerically controlled composite machine.

The tool includes a rotating cutting tool that performs a cutting process on a workpiece which is rotated and stopped while being mounted on a spindle. Examples of the rotating cutting tool include an end mill, a milling tool, a drilling tool, a boring tool, and the like. Hereinafter, the "rotating cutting tool" is abbreviated as the "tool".

It is evaluated that productivity of the machine tool is good as material removal rate (MRR) per time is higher and it is evaluated that a processing grade is good as surface roughness of a processing surface is smooth.

A cutting volume per time is determined according to cutting parameters such as a radial depth of cut, an axial depth of cut, main axis revolutions per minute, and a feed rate. If any one of the cutting parameters is increased, the cutting volume is increased. However, when vibration chatter occurs in spite of improved productivity, the processing grade may deteriorate.

Accordingly, an optimal cutting condition needs to be set in order to satisfy both productivity improvement and the processing grade.

Meanwhile, there is a case that a cutting condition of the tool is presented as a manual recommended by a tool manufacturer. However, the cutting condition recommended as a manual by tool manufacturer is just provided based on a maximum allowable static processing load and is not provided based on a chatter vibration characteristic which occurs during a cutting process Accordingly, there is a problem in that it is impossible to handle breakages of the tool and the workpiece under chatter vibration which occurs during the cutting process and a dynamic processing load amplified through the chatter vibration. As a result, a worker tends to perform the cutting process by setting a much more stable cutting condition than the manual recommendation condition.

The aforementioned chatter vibration is characterized in that the chatter vibration is consistently varied due to a lot of causes such as a tool type, a tool shape, a tool overhang length, hardness of the work, a processing position (X, Y, and Z coordinate positions), and the like.

That is, since the worker applies a very conservative cutting condition among the manual recommendation conditions presented by the tool manufacturer, the productivity deteriorates.

On the other hand, when the cutting process is started, it is very difficult to change a value of a depth of cut particularly axial depth of cut while the cutting process is performed. That is, when the cutting process is performed by incorrectly setting an initial depth of cut in the cutting process, the depth of cut cannot be corrected easily while the cutting process is performed, and as a result, since there is a concern that the processing grade of the workpiece is lowered or the productivity deteriorates, it is very important to set an initial axial depth of cut.

SUMMARY

The present disclosure has been made in an effort to provide a setting method and a control device for initial axial depth of cut of a rotating cutting tool that can achieve improvement of productivity and improvement of a processing grade by setting an initial axial depth of cut at a step of planning a cutting process.

Technical objects to be solved by the present disclosure are not limited to the aforementioned technical objects and unmentioned technical objects will be clearly understood by those skilled in the art from the specification and the appended claims.

An exemplary embodiment of the present disclosure provides a setting method of for initial axial depth of cut of a rotating cutting tool, including: when a tool T is mounted on a spindle S, receiving, an overhang length L of the tool T, a diameter D of the tool T, an overhang length ratio reference value C, and an axial depth of cut reference value E; calculating an axial depth of cut Y by Equations 1, 2, 3, and 4; and setting the axial depth of cut Y as an initial axial depth of cut of a cutting process.

$$A = \frac{L}{D} \qquad \text{[Equation 1]}$$

A: Overhang length ratio
L: Overhang length
D: Tool diameter $$B = \frac{C}{A} \qquad \text{[Equation 2]}$$

B: Ratio of overhang length to reference value
A: Overhang length ratio
C: Overhang length ratio reference value $$\kappa = B^{-3} \qquad \text{[Equation 3]}$$

κ: Rigidity weight
B: Ratio of overhang length to reference value $$Y = E \times \kappa \qquad \text{[Equation 4]}$$

Y: Axial depth of cut
κ: Rigidity weight
E: Axial depth of cut reference value (15)

The setting method of an initial axial depth of cut for a rotating cutting tool may further include: subtracting a corrected constant n from the axial depth of cut by Equation 5 to calculate a corrected axial depth of cut Ad; and setting the corrected axial depth of cut Ad as an initial axial depth of cut of the cutting process.

$$Ad = Y - n \qquad \text{[Equation 5]}$$

Ad: Corrected axial depth of cut
Y: Axial depth of cut
n: Corrected constant

When the axial depth of cut Y is equal to or more than 10 mm, correction is not performed, and when the axial depth of cut Y is less than 10 mm and equal to or more than 5 mm, 0.1 mm is subtracted for correction, when the axial depth of cut Y is less than 5 mm and equal to or more than 2 mm, 0.2 mm is subtracted for correction, and when the axial depth of cut Y is less than 2 mm, 0.3 mm is subtracted for correction.

Another exemplary embodiment of the present disclosure provides a control device of a depth of cut in an initial axis direction for a rotating cutting tool, wherein a machining tool is controlled by the axial depth of cut Y value calculated by the setting method of a depth of cut in an initial axial direction for a rotating cutting tool.

Yet another exemplary embodiment of the present disclosure provides a control device of a depth of cut in an initial axis direction for a rotating cutting tool, wherein a machining tool is controlled by a corrected axial depth of cut Ad calculated by the setting method of a depth of cut in an initial axial direction for a rotating cutting tool.

Other detailed contents of the exemplary embodiments are included in the description and drawings.

The setting method and the control device of the depth of cut in the initial axial direction for the rotating cutting tool according to the present disclosure configured as above, the initial axial depth of cut can be optimally set in the step of planning the cutting process and the initial axial depth of cut set at this time can improve the productivity and excellently implement the processing grade at the time of performing the cutting process.

According to the setting method and control device of the depth of cut in the initial axial direction for the rotating cutting tool, since the initial recommended axial depth of cut Y and the corrected axial depth of cut Ad are acquired by reflecting variables for the overhang length and the diameter of the tool, the initial recommended axial depth of cut Y and the corrected axial depth of cut Ad may be applied to all tool diameters having various rigidities. That is, by excellently selecting an initial cutting condition (axial depth of cut) that enables processing stability control upon processing are excellently selected with respect to various tool types and tool overhang lengths applied to the machining tool, reliability of real-time chatter vibration reduction may be improved and the initial cutting condition may be applied to be generally used.

According to the setting method and control device of the depth of cut in the initial axial direction for the rotating cutting tool, the axial depth of cut for each overhang length for the overhang length L may be selected without dynamic analysis competency and materials for a tool part (the tool and a holder).

According to the setting method and control device of the depth of cut in the initial axial direction for the rotating cutting tool, the recommended axial depth of cuts for all tool types and tool lengths to be applied to the cutting process may be easily derived before an actual cutting process in molding process in which tool variation is frequent. That is, since the corrected axial depth of cut Ad derived by the present disclosure may be easily reflected to generating a tool path and a numerical control (NC) code, a processing error may be prevented when performing the cutting process.

The foregoing summary is illustrative only and is not intended to be in any way limiting. In addition to the illustrative aspects, embodiments, and features described above, further aspects, embodiments, and features will become apparent by reference to the drawings and the following detailed description.

DESCRIPTION OF THE DRAWINGS

FIG. 4 is a table illustrating a recommended axial depth of cut and a corrected axial depth of cut deduced by a setting method of a depth of cut in an initial axial direction for a rotating cutting tool according to an exemplary embodiment of the present disclosure.

DETAILED DESCRIPTION

Figure 1:
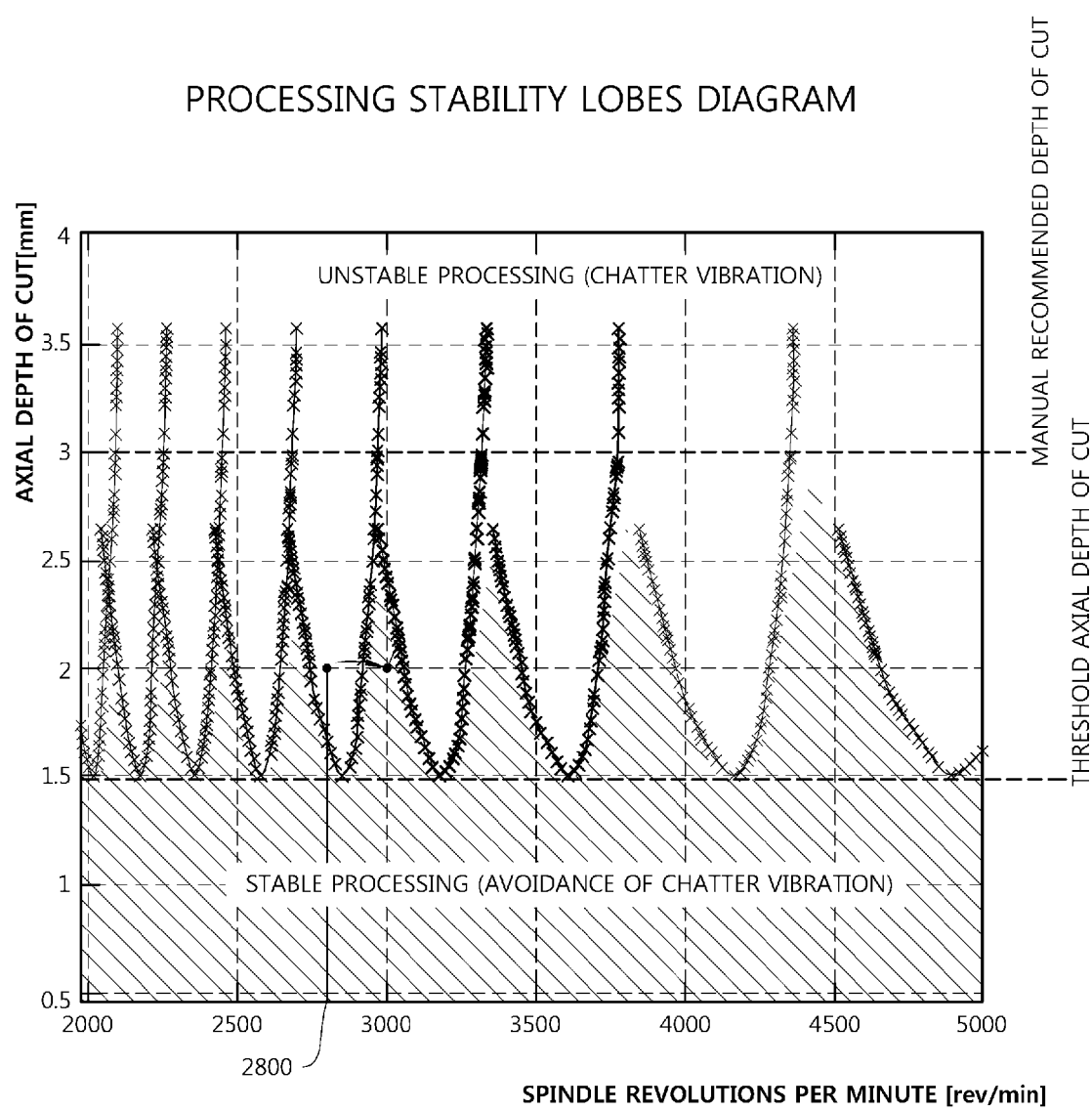
FIG. 1 is a processing stability line diagram illustrating a correlation of a depth of cut in an axial direction to the revolutions per minute of a spindle.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Various advantages and features of the present disclosure and methods accomplishing thereof will become apparent from the following description of embodiments with reference to the accompanying drawings.

Hereinafter, embodiments of the present disclosure will be described in detail with reference to the accompanying drawings. Exemplary embodiments described hereinafter are exemplarily described in order to assist understanding the present disclosure and it should be understood that the present disclosure are variously modified and executed unlike the exemplary embodiments described herein. However, in describing the present disclosure, when it is determined that the detailed description of related known functions or components may obscure the gist of the present disclosure, the detailed description and concrete illustration will be omitted. Further, the accompanying drawings are not illustrated in an actual scale but some components may be enlarged in order to understand the present disclosure.

Meanwhile, since terms to be described below as terms set by considering the function in the present disclosure may depend on according to an intention or a custom of a producer, the terms will be defined based on contents throughout the specification.

Like reference numerals indicate like elements throughout the specification.

First, processing stability depending on a correlation of the revolutions per minute of a spindle and an axial depth of cut when performing a cutting process will be described with reference to FIG. 1 accompanied.

FIG. 1 accompanied is a processing stability line diagram illustrating a correlation of a depth of cut in an axial direction to the revolutions per minute of a spindle.

As illustrated in FIG. 1, according to the processing stability line diagram, while there is an area where even though the axial depth of cut at the specific revolutions per minute of the spindle is large, processing is stabilized and chatter vibration is thus avoided, there is an area where even though the axial depth of cutis small at other specific revolutions per minute of the spindle, the processing is unstable and the chatter vibration is generated.

Meanwhile, a tool manufacturer presents a manual recommendation axial depth of cut. However, since the manual recommendation axial depth of cutis selected in a static processing state, it is difficult to apply the manual recommendation axial depth of cut in the situation in which dynamic chatter vibration is generated. That is, the reason is that even in the manual recommendation axial depth of cut, the chatter vibration is generated at the specific revolutions per minute of the spindle.

Meanwhile, the chatter vibration is avoided at any revolutions per minute of the spindle in a threshold axial depth of cut. However, when the cutting process is performed by selecting the threshold axial depth of cut, productivity deteriorates to be very low.

Accordingly, application of a cutting amount at the same level as the case in which the cutting process is performed in the manual recommendation depth of cut is required for improving the productivity, and vibration suppression and avoidance through consistent vibration characteristic evaluation and analysis should be particularly accompanied during the cutting process.

The chatter vibration or not during the cutting process depends on a real-time processing stability characteristic which is varied according to a processing condition and in particular, the processing stability may be determined by adjusting the cutting condition such as the revolutions per minute of the spindle. For example, as illustrated in FIG. 1, the chatter vibration is generated in the situation in which the revolutions per minute of the spindle is set to 2800 rev/min and the axial depth of cutis set to 2 mm, but the chatter vibration may be avoided in the situation in which the revolutions per minute of the spindle is set to 3000 rev/min and the axial depth of cutis set to 2 mm.

That is, a scheme which is sequentially and effectively applicable to all cutting processes (a planning step and a processing step) in order to improve the productivity and avoid the chatter vibration needs to be set.

In particular, it is very important to select the depth of cut in the initial axial direction before processing in order to perform the cutting process in a processing stability area by adjusting the revolutions per minute of the spindle.

When the initial axial depth of cutis selected to be too large, the processing stability may not be ensured in spite of adjusting the revolutions per minute of the spindle. For example, in FIG. 1, the reason is that when the initial axial depth of cutis set to 3 mm, the depth of cut is not included in the processing stability area in spite of changing the revolutions per minute of the spindle.

On the contrary, when the initial axial depth of cutis selected to be too small, the processing stability is ensured and processing quality is thus ensured, but the productivity deteriorates due to a consecutive processing condition. For example, the reason is that in FIG. 1, when the workpiece is processed while the axial depth of cutis set to 1.5 mm, the productivity deteriorates because a cutting amount is very small even though the chatter vibration may be avoided.

That is, the initial axial depth of cut enables the processing stability to be ensured by adjusting the revolutions per minute of the spindle upon the cutting process, and the initial axial depth of cut needs to be selected in the process planning step under a preset condition so as not to degrade the productivity.

Hereinafter, a condition in which the chatter vibration is decreased depending on an overhang length L of the tool T among cutting process conditions will be described with reference to FIGS. 2 and 3.

Figure 2:
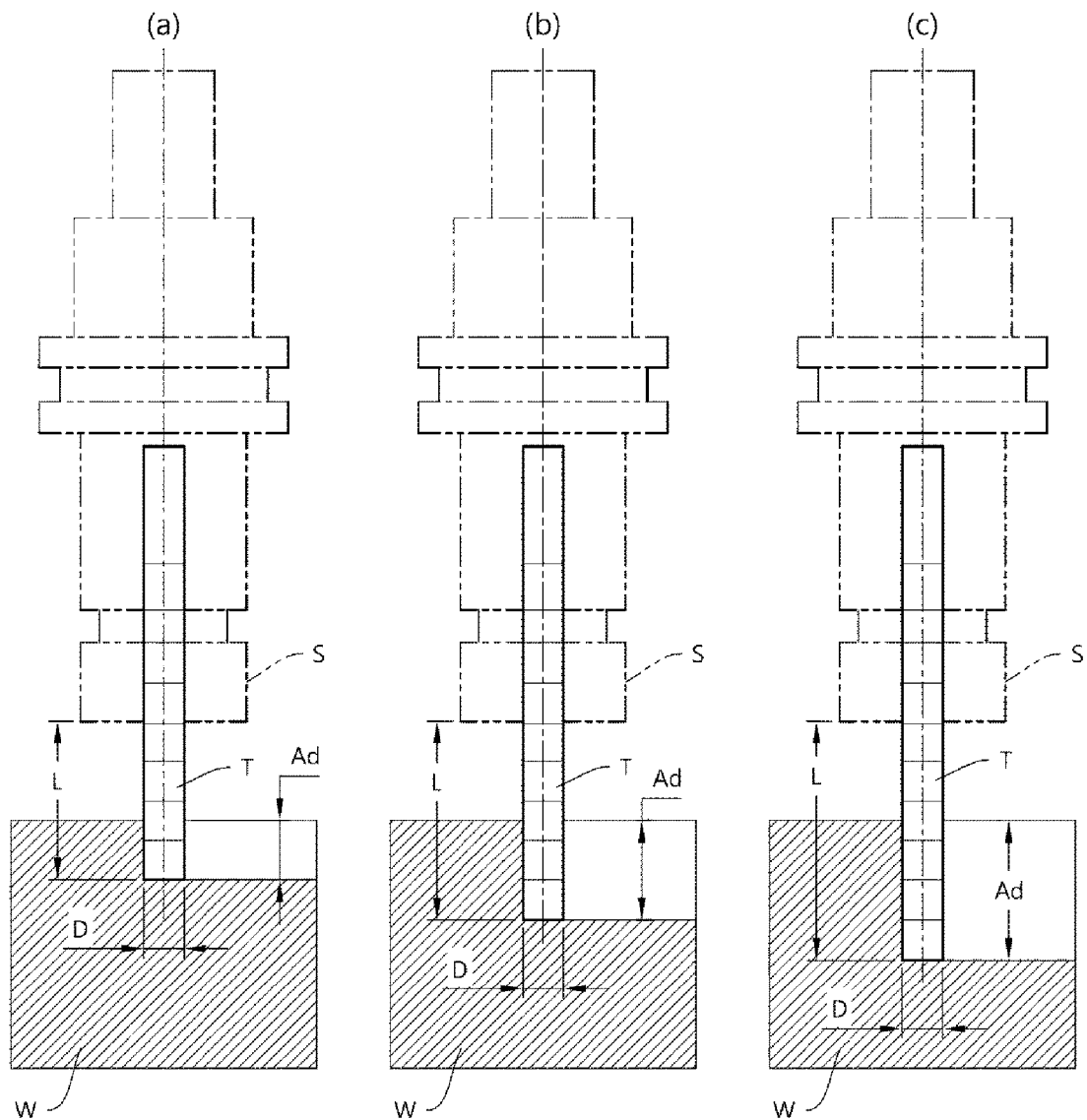
FIG. 2 is a diagram for describing an overhang length and a depth of cut of a tool in the spindle.

FIG. 2 accompanied is a diagram for describing an overhang length and a depth of cut of a tool in the spindle. FIG. 3 is a graph illustrating evaluation of rigidity depending on an overhang length ratio of the tool.

In the chatter vibration, the overhang length of the tool is closely associated with the diameter of the tool. That is, although the diameter D of the tool T is constant, as the overhang length L protruded from the spindle S increases, there is a high possibility that the chatter vibration will be generated and as the overhang length L protruded from the spindle S decreases, the generation of the chatter vibration is reduced.

Hereinafter, a ratio of the overhang length L to the diameter D of the tool T will be referred to as an "overhang length ratio A". The overhang length ratio A is acquired by [Equation 1] given below.

$$A = \frac{L}{D} \quad \text{[Equation 1]}$$

A: Overhang length ratio
L: Overhang length
D: Tool diameter

When the example illustrated in FIG. 2 is examined with reference to Equation 1, the overhang length ratio A illustrated in FIG. 2A is 4 because the overhang length L is four times larger than the diameter D. Similarly, the overhang length ratio A of FIG. 2B is 5 and the overhang length ratio A of FIG. 2C is 6. Herein, in the example of FIG. 2A having the smallest overhang length ratio A, the most stable cutting process may be performed. Meanwhile, a corrected axial depth of cut Ad may be set to be largest in the example of FIG. 2C, and as a result, the cutting amount may be set to the largest value.

Meanwhile, an overhang length which is actually protruded may be differently set from a reference value presented by the tool manufacturer. An overhang length ratio B to the reference value may be expressed by a value obtained by dividing an overhang length ratio reference value C by the overhang length ratio A, as illustrated in Equation 2.

$$B = \frac{C}{A} \qquad \text{[Equation 2]}$$

B: Ratio of overhang length to reference value
A: Overhang length ratio
C: Overhang length ratio reference value The overhang length ratio reference value may be 3 in [Equation 2]. Herein, the overhang length ratio reference value is the manual recommendation value presented by the tool manufacturer and different values may be presented according to the shape of the tool or the characteristic of the tool.

Meanwhile, the generation of the chatter vibration is associated with rigidity k. The rigidity k will be described with reference to FIG. 3. FIG. 3 accompanied is a graph illustrating the evaluation of rigidity depending on the overhang length ratio of the tool.

The rigidity k may be calculated by a rigidity relational equation. When the overhang length ratio B to the reference value is substituted in the rigidity relational equation, this may be expressed by Equation 3.

$$\kappa = B^{-3} \qquad \text{[Equation 3]}$$

κ: Rigidity weight
B: Ratio of overhang length to reference value

Figure 3:
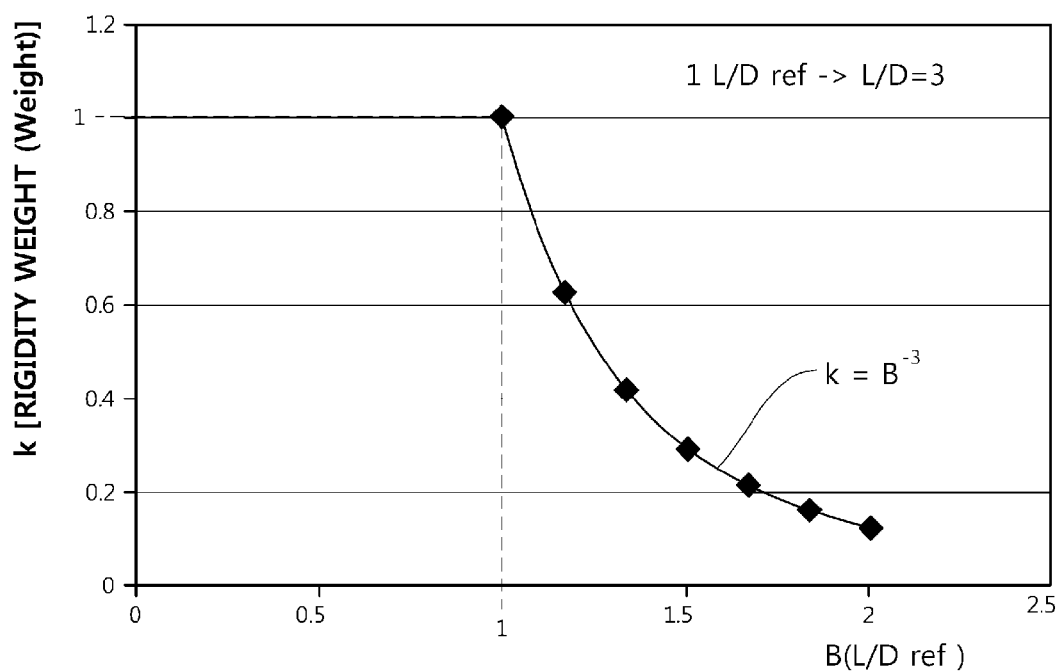
FIG. 3 is a graph illustrating evaluation of rigidity depending on an overhang length ratio of the tool.

That is, according to Equation 3 and FIG. 3, it may be seen that when the overhang length ratio B to the reference value is 1, the rigidity is strongest and when the overhang length ratio B to the reference value increases, the rigidity k may be abruptly decreased.

That is, the corrected axial depth of cut Ad may be selected for each overhang length by reflecting a rigidity variation depending on the overhang length variation from the overhang length of the tool T by using Equations 1, 2, and 3.

An axial depth of cut Y may be acquired by Equation 4.

$$Y = E \times \kappa \qquad \text{[Equation 4]}$$

Y: Axial depth of cut
κ: Rigidity weight
E: Axial depth of cut reference value (15)

An axial depth of cut reference value may be 15 in [Equation 4]. Herein, an axial depth of cut reference value E of 15 is the manual recommendation value presented by the tool manufacturer and different values may be presented according to the shape of the tool or the characteristic of the tool.

Meanwhile, in the case of a tool such as a drill, a cross-section of the tool may have a pointed shape. In this case, since the rigidity of the end may be changed, a corrected axial depth of cut Ad may be derived by correcting the value of the axial depth of cut Y acquired in Equation 4. The corrected axial depth of cut Ad is calculated by Equation 5.

$$Ad = Y - n \qquad \text{[Equation 5]}$$

Ad: Corrected axial depth of cut
Y: Axial depth of cut
n: Corrected constant

Meanwhile, an actual shape of the tool T may be provided as a shape in which the end is pointed and since the pointed shape influences the rigidity k, a corrected constant n may be differently set by considering the influence of the shape on the rigidity. As a result, the corrected axial depth of cut Ad may be derived more deliberately. As the corrected constant n corrected in Equation 5, the corrected value may be differently set according to a condition presented in Equation 6.

$$\text{if}(Y \geq 10.0), n=0$$

$$\text{if}(10.0 > Y \geq 5.0), n=0.1$$

$$\text{if}(5.0 > Y \geq 2.0), n=0.2$$

$$\text{if}(2.0 > Y), n=0.3 \qquad \text{[Equation 6]}$$

Figure 8:
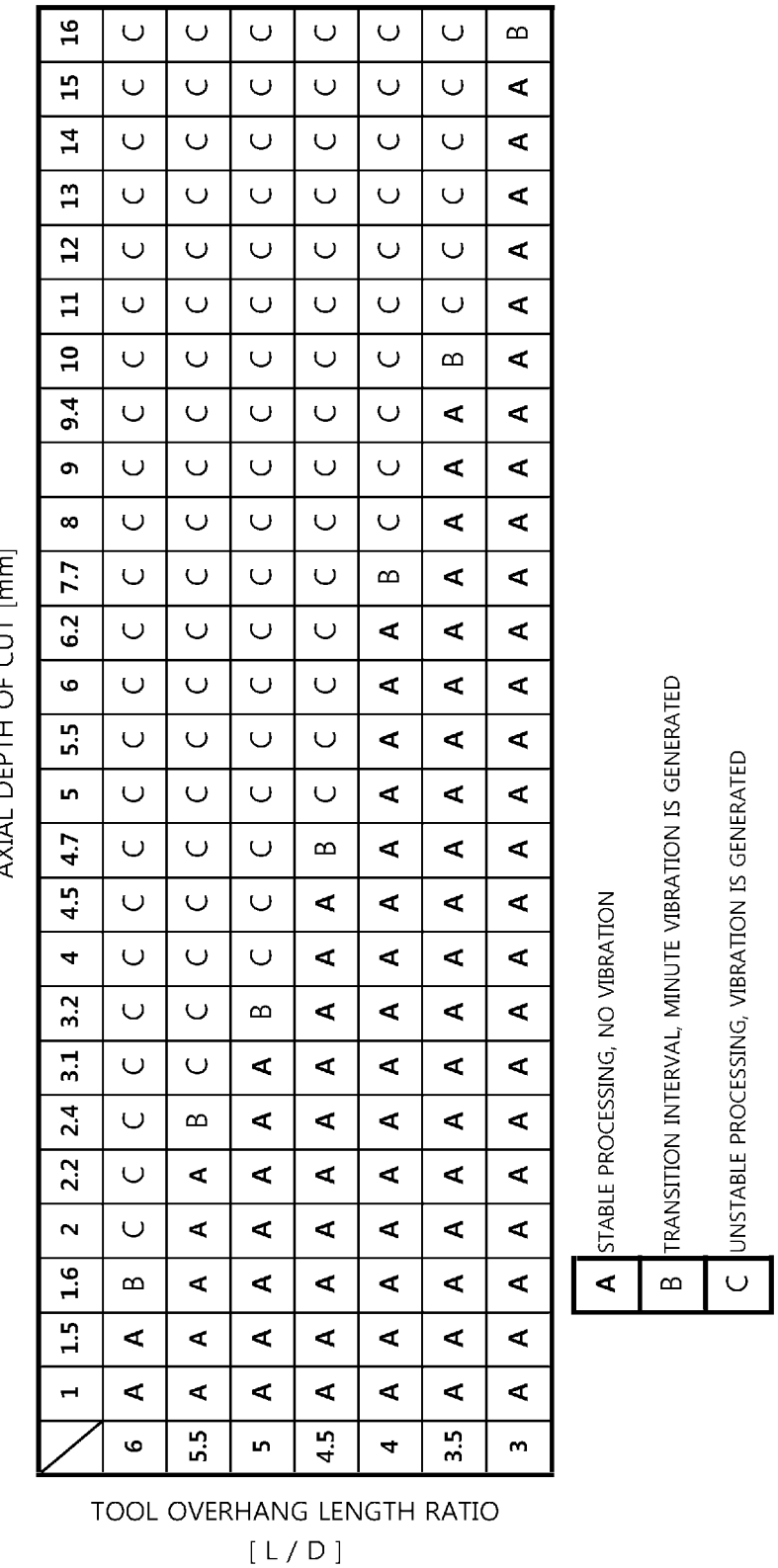
FIG. 8 is an evaluation table for evaluating the resulting cutting quality after performing a cutting process in a state in which a depth of cut is set by a setting method of a depth of cut in an initial direction for a rotating cutting tool according to an exemplary embodiment of the present disclosure.

According to Equation 6, as the corrected axial depth of cut Ad is smaller, the corrected constant n is set to be larger. In particular, when the axial depth of cut Y is equal to or more than 10 mm, correction is not performed, and when the axial depth of cut Y is less than 10 mm and equal to or more than 5 mm, 0.1 mm is subtracted for correction, when the axial depth of cut Y is less than 5 mm and equal to or more than 2 mm, 0.2 mm is subtracted for correction, and when the axial depth of cut Y is less than 2 mm, 0.3 mm is corrected. Herein, the corrected value n is a value acquired as an excellent value through an experiment and verification as illustrated in FIG. 8.

Hereinafter, a setting method and a control device of a depth of cut in an initial axial direction for a rotating cutting tool according to an exemplary embodiment of the present disclosure will be described with reference to FIGS. 4 to 7.

Figure 5:
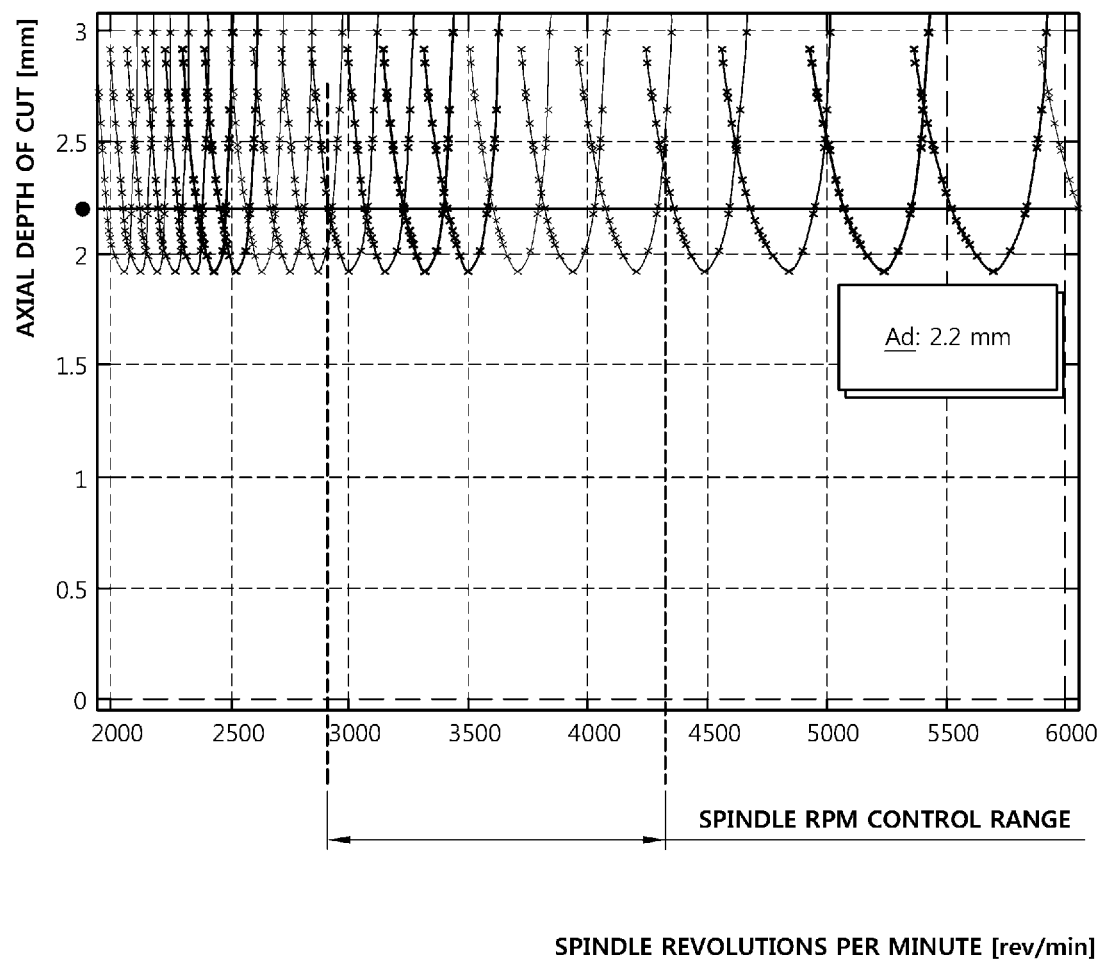
FIG. 5 is a chatter vibration line diagram when a setting method and a control device of a depth of cut in an initial axial direction for a rotating cutting tool according to an exemplary embodiment of the present disclosure are applied.
Figure 6:
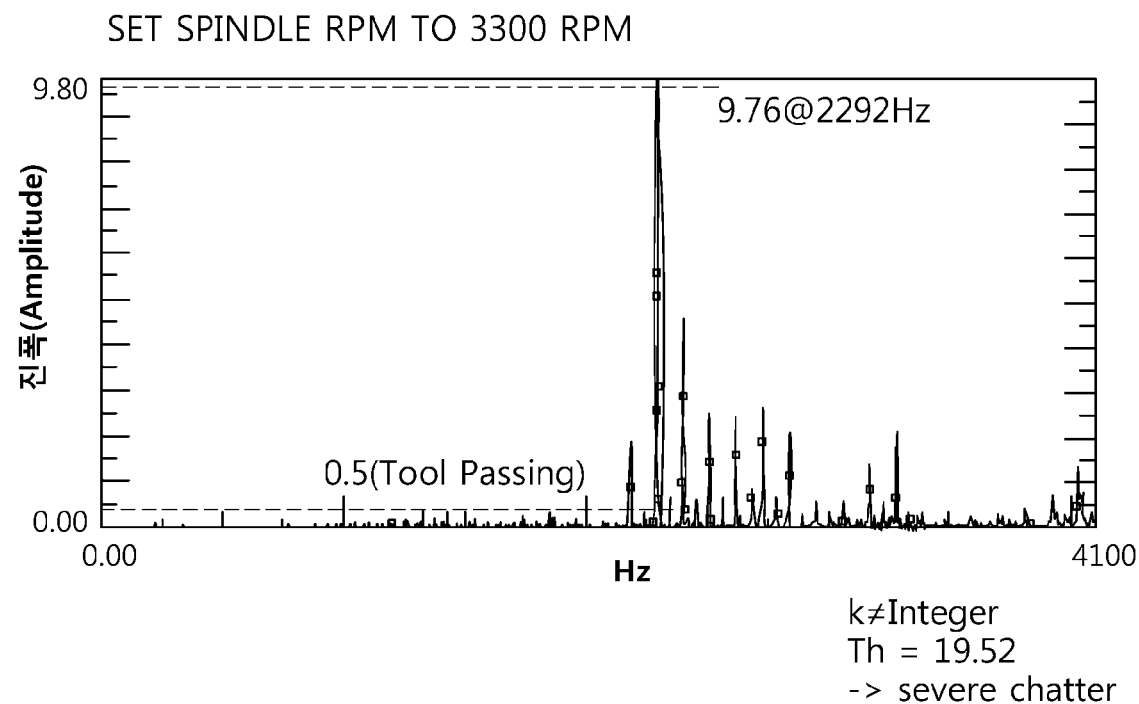
FIG. 6 is a diagram for describing chatter vibration according to a comparative example.
Figure 7:
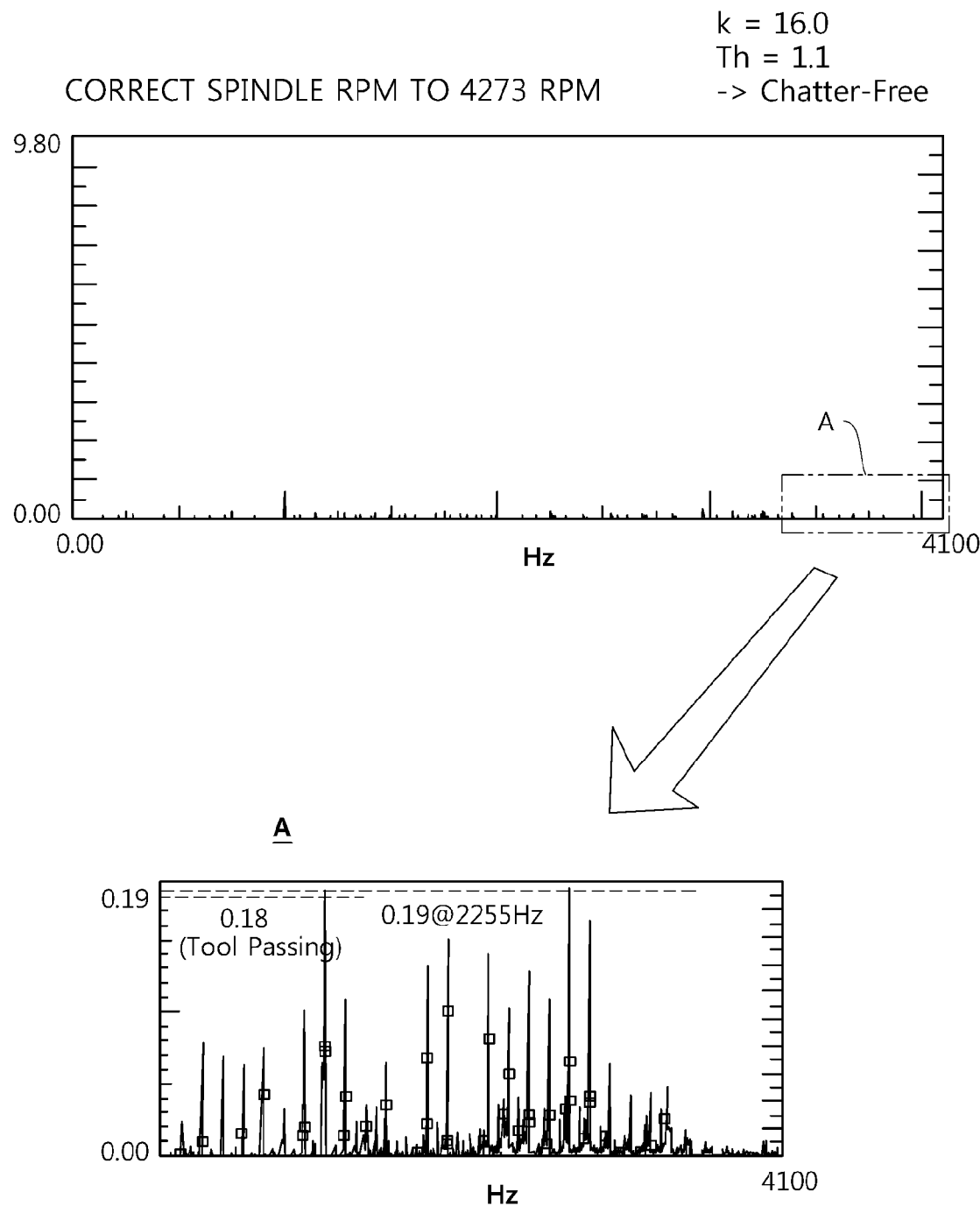
FIG. 7 is a chatter vibration line diagram and a partial detailed diagram when the setting method and the control device of a depth of cut in an initial axial direction for a rotating cutting tool according to the exemplary embodiment of the present disclosure are applied.

FIG. 4 accompanied is a table illustrating a recommended axial depth of cut and a correction axial depth of cut deduced by a setting method of a depth of cut in an initial axial direction for a rotating cutting tool according to an exemplary embodiment of the present disclosure. FIG. 5 is a chatter vibration line diagram when a setting method and a control device of a depth of cut in an initial axial direction for a rotating cutting tool according to an exemplary embodiment of the present disclosure are applied. FIG. 6 is a diagram for describing chatter vibration according to a comparative example. FIG. 7 is a chatter vibration line diagram and a partial detailed diagram when the setting method and the control device of a depth of cut in an initial axial direction for a rotating cutting tool according to the exemplary embodiment of the present disclosure are applied.

As illustrated in FIG. 4, a recommendation direction depth of cut Y is derived by Equations 1, 2, 3, and 4. The example value illustrated in FIG. 4 is an example in which the tool diameter D is set to 10 mm, the overhang length ratio reference value C is set to 3, and the axial depth of cut reference value E is set to 15 mm. That is, when the tool diameter D is changed, the derived result value is naturally changed and the value disclosed in FIG. 4 is presented for understanding the present disclosure.

That is, when the overhang length ratio A is 5.5, 1.83 is derived as the overhang length ratio B to the reference value by Equation 2 and as the rigidity k, 0.16 is derived by Equation 3. As the recommended axial depth of cut Y, 2.4 mm is derived by Equation 4.

Thereafter, as the recommended axial depth of cut Y, 2.2 mm may be derived according to Equations 5 and 6.

That is, in the case where the overhang length L of the tool T is set to 55 when the tool T is mounted on the spindle S, the initial axial depth of cut is set to 2.2 mm to perform the cutting process.

According to FIG. 5, in the case where the spindle revolutions per minute is adjusted when the axial depth of cut is set to 2.2 mm in the processing stability line diagram, the depth of cut may be continuously positioned in the processing stability area. That is, when the spindle revolutions per minute (rev/min) is 3000 rev/min, vibration may be generated, but the chatter vibration may be avoided by adjusting the spindle revolutions per minute (rev/min) to 3100 rev/min.

FIG. 6 illustrates, through a graph, vibration generated when the axial depth of cut is not corrected, and a general cutting process is performed and there is a tendency that the amplitude is increased to maximum 9.76 in some intervals when the cutting process is performed at the spindle of 3300 rpm. That is, it may be known that severe chatter occurs.

FIG. 7 illustrates, through a graph, vibration generated by correcting the initial axial depth of cut and performing the cutting process. The spindle revolutions per minute are corrected as described above and the spindle revolutions per minute are corrected to 4273 rpm under the same condition as the cutting condition performed in FIG. 6. Therefore, the amplitude of the vibration has a maximum value of 0.19 which is barely verified in a detailed diagram.

That is, according to the present disclosure, when the initial axial depth of cut is optimally presented and the cutting process is performed by the presented axial depth of cut value to correct the spindle revolutions per minute. That is, as a currently set tool length, an optimal axial depth of cut may be rapidly presented.

Hereinafter, cutting quality will be described with reference to FIG. 8 which is accompanied. FIG. 8 is an evaluation table for evaluating the resulting cutting quality after performing a cutting process in a state in which a depth of cut is set by a setting method of a depth of cut in an initial direction for a rotating cutting tool according to an exemplary embodiment of the present disclosure.

The example value illustrated in FIG. 8 is a value obtained when the tool diameter D is set to 10 mm and the overhang length ratio reference value C is set to 3, and as a result, the cutting process is performed according to a change in overhang length of the tool T, that is, the overhang length ratio A and the resulting evaluation is performed. The cutting process is evaluated as Processing safety, a transient interval, and processing instability according to the performed result value.

In FIG. 4, it may be known that the axial depth of cut value calculated by the equation and a result value acquired by actually performing processing coincide with each other to be verified, in the exemplary embodiment of the present disclosure.

For example, when the overhang length ratio (L/D) of the tool is set to 5.5, the corrected axial depth of cut Ad value presented according to the present disclosure is 2.2 mm and when the cutting process is performed with the depth of cut of 2.2 mm in actual evaluation, the chatter vibration is not generated and the stable cutting process is implemented.

As another example, when the overhang length ratio (L/D) of the tool is set to 4, the corrected axial depth of cut Ad value presented according to the present disclosure is 6.2 mm and when the cutting process is performed with the depth of cut of 6.2 mm in actual evaluation, the chatter vibration is not generated and the stable cutting process is implemented.

On the other hand, the corrected axial depth of cut Ad derived by Equations 1, 2, 3, 4, 5, and 6 according to the present disclosure is mounted on a control unit of a machining tool to be automatically calculated. This will be described with reference to FIG. 9 accompanied.

Figure 9:
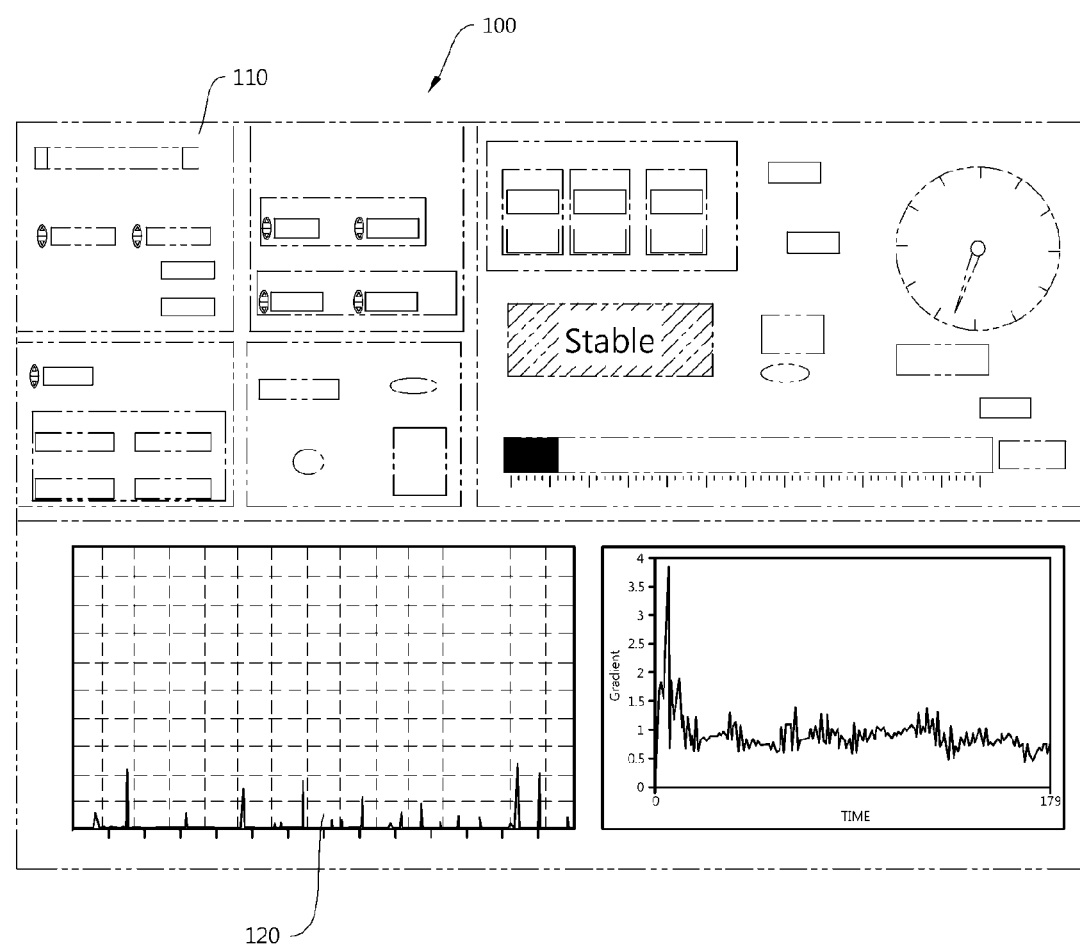
FIG. 9 is a diagram for describing an example of a control device for performing a setting method of a depth of cut in an initial axial direction for a rotating cutting tool according to an exemplary embodiment of the present disclosure.

FIG. 9 accompanied is a diagram for describing an example of a control device for performing a setting method of a depth of cut in an initial axial direction for a rotating cutting tool according to an exemplary embodiment of the present disclosure.

Referring to FIG. 9, a control device 100 is configured to include a basic data setting unit 110 and a monitoring unit 120. The control device 100 may be a control unit that controls the machining tool. Further, the control device 100 may be a dedicated terminal provided to control the machining tool. Meanwhile, Equations 1, 2, 3, 4, 5, and 6 are input in the control device 100.

That is, in a basic data input unit 110, basic information of the tool T, for example, information including the diameter D of the tool and the overhang length L of the tool are input.

Thereafter, the recommended axial depth of cut Y or the corrected axial depth of cut Ad is calculated based on the basic information input by the control unit of the control device 100 to be displayed the basic data input unit 110.

Therefore, the worker may perform the cutting process by referring to a presented value without arbitrarily setting the initial axial depth of cut.

In particular, according to the setting method and the control device of the depth of cut in the initial axial direction for the rotating cutting tool, in the case of the initial axial depth of cut, a cantilever rigidity variation ratio by overhang length variation to a reference value overhang length of the tool is reflected to the recommended axial depth of cut Y to select the initial recommended axial depth of cut Y and the corrected axial depth of cut Ad.

According to the setting method and the control device of the depth of cut in the initial axial direction for the rotating cutting tool, since the initial recommended axial depth of cut Y and the corrected axial depth of cut Ad are acquired by reflecting variables for the overhang length and the diameter of the tool, the initial recommended axial depth of cut Y and the corrected axial depth of cut Ad may be applied to all tool diameters having various rigidities. That is, by excellently selecting an initial cutting condition (axial depth of cut) that enables processing stability control upon processing are excellently selected with respect to various tool types and tool overhang lengths applied to the machining tool, reliability of real-time chatter vibration reduction may be improved and the initial cutting condition may be applied to be generally used.

According to the setting method and the control device of the depth of cut in the initial axial direction for the rotating cutting tool, the axial depth of cut for each overhang length for the overhang length L may be selected without dynamic analysis competency and materials for a tool part (the tool and a holder).

According to the setting method and the control device of the depth of cut in the initial axial direction for the rotating cutting tool, the recommended axial depth of cuts for all tool types and tool lengths to be applied to the cutting process may be easily derived before an actual cutting process in molding process in which tool variation is frequent. That is, since the corrected axial depth of cut Ad derived by the present disclosure may be easily reflected to generating a tool path and a numerical control (NC) code, a processing error may be prevented when performing the cutting process.

Although the exemplary embodiments of the present disclosure have been described with reference to the accompanying drawings as described above, those skilled in the art will be able to understand that the present disclosure can be implemented in other detailed forms without changing the technical spirit or an essential characteristic.

Therefore, it should be understood that embodiments described as above are exemplary in all aspects and are not limitative and it should be analyzed that the scope of the present disclosure is shown by the appended claims to be described below, and the meaning and the scope of the appended claims, and all changed or modified forms derived from the equivalents thereto are included in the scope of the present disclosure.

The setting method and the control device of a depth of cut in an initial axial direction for a rotating cutting tool according to the present disclosure can be used to select an initial axial cutting depth at the time of performing the cutting process.

From the foregoing, it will be appreciated that various embodiments of the present disclosure have been described herein for purposes of illustration, and that various modifications may be made without departing from the scope and spirit of the present disclosure. The exemplary embodiments disclosed in the specification of the present disclosure will not limit the present disclosure. The scope of the present disclosure will be interpreted by the claims below, and it will be construed that all techniques within the scope equivalent thereto belong to the scope of the present disclosure.

What is claimed is:

1. A method for setting a depth of cut in an initial axial direction for a rotating cutting tool and operating the tool accordingly, comprising:
when a tool T is mounted on a spindle S, receiving, an overhang length L of the tool T, a diameter D of the tool T, an overhang length ratio reference value C, and an axial depth of cut reference value E;
calculating an axial depth of cut Y by Equations 1, 2, 3, and 4,
wherein Equation 1 is $$A = \frac{L}{D}$$

A: Overhang length ratio
L: Overhang length
D: Tool diameter,
wherein Equation 2 is $$B = \frac{C}{A}$$

B: Ratio of overhang length to reference value
A: Overhang length ratio
C: Overhang length ratio reference value,
wherein Equation 3 is $$\kappa = B^{-3}$$

$\kappa$: Rigidity weight
B: Ratio of overhang length to reference value, and
wherein Equation 4 is $$Y = E \times \kappa$$

Y: Axial depth of cut
$\kappa$: Rigidity weight
E: Axial depth of cut reference value (15);

setting the axial depth of cut Y as an initial axial depth of cut of a cutting process; and initiating the cutting process at the initial axial depth.

2. The method of claim 1, further comprising:
subtracting a corrected constant n from the axial depth of cut by Equation 5 to calculate a corrected axial depth of cut Ad, wherein Equation 5 is $$Ad = Y - n$$

Ad: Corrected axial depth of cut
Y: Axial depth of cut
n: Corrected constant; and
setting the corrected axial depth of cut Ad as an initial axial depth of cut of the cutting process.

3. The method of claim 2, wherein
when the axial depth of cut Y is equal to or more than 10 mm, calculating and setting of the corrected axial depth of cut Ad is not performed,
when the axial depth of cut Y is less than 10 mm and equal to or more than 5 mm, 0.1 mm is the corrected constant n subtracted for calculating the corrected axial depth of cut Ad,
when the axial depth of cut Y is less than 5 mm and equal to or more than 2 mm, 0.2 mm is the corrected constant n subtracted for calculating the corrected axial depth of cut Ad, and
when the axial depth of cut Y is less than 2 mm, 0.3 mm is the corrected constant n subtracted for calculating the corrected axial depth of cut Ad.

4. A control device for implementing the method of claim 1, comprising:
a processor; and
a non-transitory computer readable medium including:
first instructions executable by the processor to calculate an axial depth of cut Y by the Equations 1, 2, 3, and 4;
second instructions executable by the processor to set an axial depth of cut Y as an initial axial depth of cut of a cutting process; and
third instructions executable by the processor to initiate a cutting process at an initial axial depth.

5. A control device for implementing the method of claim 2, comprising:
a processor; and
a non-transitory computer readable medium including:
first instructions executable by the processor to calculate an axial depth of cut Y by the Equations 1, 2, 3, and 4;
second instructions executable by the processor to set an axial depth of cut Y as an initial axial depth of cut of a cutting process;
third instructions executable by the processor to initiate a cutting process at an initial axial depth;
fourth instructions executable by the processor to subtract a corrected constant n from an axial depth of cut by the Equation 5 to calculate a corrected axial depth of cut Ad; and
fifth instructions executable by the processor to set a corrected axial depth of cut Ad as an initial axial depth of cut of a cutting process.

6. A control device for implementing the method of claim 3, comprising:
a processor; and
a non-transitory computer readable medium including:
first instructions executable by the processor to calculate an axial depth of cut Y by the Equations 1, 2, 3, and 4;
second instructions executable by the processor to set an axial depth of cut Y as an initial axial depth of cut of a cutting process;

third instructions executable by the processor to initiate a cutting process at an initial axial depth;

fourth instructions executable by the processor to subtract a corrected constant n from an axial depth of cut by the Equation 5 to calculate a corrected axial depth of cut Ad; and fifth instructions executable by the processor to set a corrected axial depth of cut Ad as an initial axial depth of cut of a cutting process, wherein the fourth and fifth instructions include:

respective instructions executable by the processor to prohibit calculating and setting a corrected axial depth of cut Ad when an axial depth of cut Y is equal to or more than 10 mm;

respective instructions executable by the processor to set 0.1 mm as the corrected constant n subtracted for calculating a corrected axial depth of cut Ad when an axial depth of cut Y is less than 10 mm and equal to or more than 5 mm;

respective instructions executable by the processor to set 0.2 mm as the corrected constant n subtracted for calculating a corrected axial depth of cut Ad when an axial depth of cut Y is less than 5 mm and equal to or more than 2 mm; and respective instructions executable by the processor to set 0.3 mm as the corrected constant n subtracted for calculating a corrected axial depth of cut Ad when an axial depth of cut Y is less than 2 mm.

* * * * *